July 14, 1936.  E. V. HALLIGAN  2,047,264
SOLDER PACKAGE
Filed Dec. 7, 1932
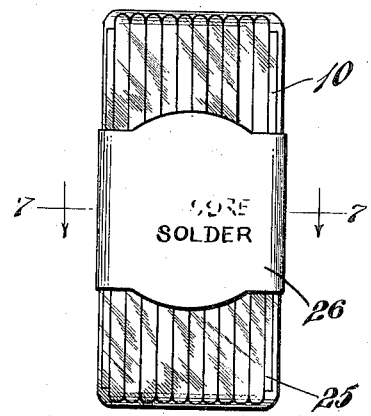
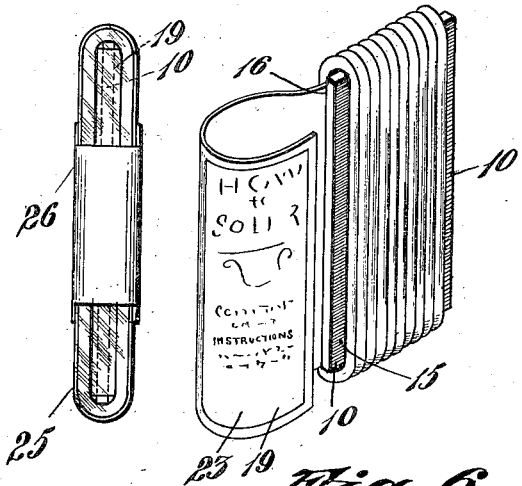
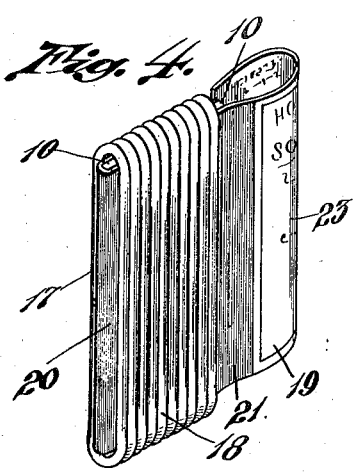
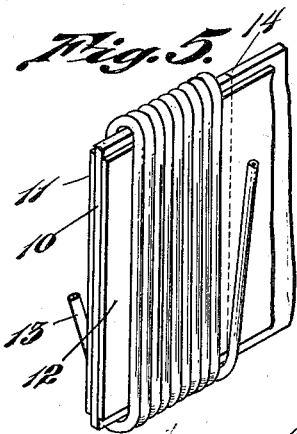
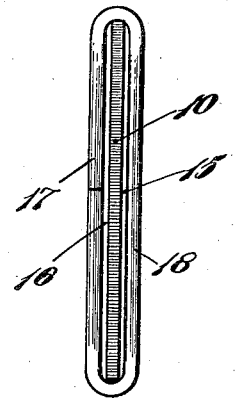
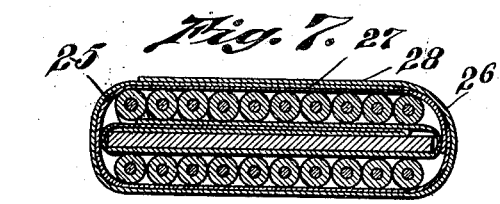
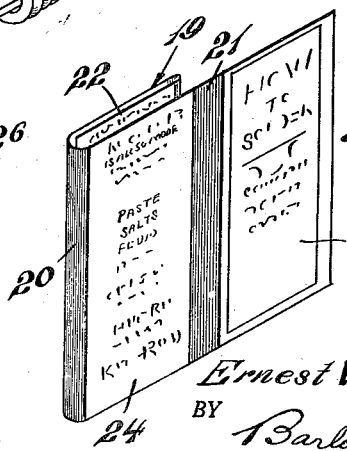
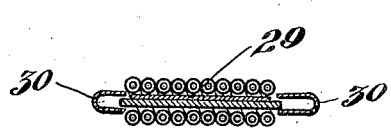
INVENTOR.
Ernest V. Halligan
BY Barlow & Barlow
ATTORNEYS.

Patented July 14, 1936

2,047,264

UNITED STATES PATENT OFFICE 2,047,264

SOLDER PACKAGE

Ernest V. Halligan, Edgewood, R. I.

Application December 7, 1932, Serial No. 646,127

1 Claim. (Cl. 206—46)

This invention relates to a package for a strip of solder and has for one of its objects the provision of a package which will be of neat appearance.

Another object of the invention is the provision of a package which will maintain a definite shape and be of compact form.

Another object of the invention is a provision of a transparent solder package which will be protected from the air and thus prevent this solder from tarnishing or changing in the appearance which it has immediately after being formed.

Another object of the invention is the provision of a package in which a booklet of instructions may be provided in a convenient form therein.

A further object of the invention is the method of forming a plurality of units side by side and then detaching the units after formed.

A still further object of the invention is the provision of a package forming method which will leave room for the assembly of a booklet or the like between the solder and the core of the package.

With these and other objects in view, the invention consists of certain novel features of construction, as will be more fully described, and particularly pointed out in the appended claims.

In the accompanying drawing:

Fig. 1 is a top plan view of the package in its finished form.

Fig. 2 is a side elevation thereof.

Fig. 3 is a perspective view showing one step in the assembly of the package.

Fig. 4 is a perspective view looking at the other side of the construction illustrated in Fig. 3.

Fig. 5 is a perspective view illustrating the manner of winding a strip of solder about the core.

Fig. 6 is an end view thereof with a part of the assembly shown in Fig. 5 removed.

Fig. 7 is a section of line 7—7 of Fig. 1.

Fig. 8 is a perspective view of booklet of instructions assembled with each package.

Fig. 9 is a diagrammatic view of a modified form of package.

Solder in strip form is not usually sold in packages and in order that the same may be conveniently handled and attractively displayed I have provided a package of solder which is protected from tarnishing, dirt and other foreign material, and which may be observed through the protecting envelope of some such material as "Cellophane" and also in packaging solder in this manner it is desirable to include an instruction booklet which I have done by providing a space between the strip of solder and the core into which space the booklet is positioned, and further in order to provide an ornamental package I have caused the edges of the booklet which protrude beyond the strip solder to be colored the same as the color of the solder, and formed this booklet of a size to cover the core and thus provide a package of uniform appearance. Also as "Cellophane" may be obtained in different colors I provide an envelope for the solder of "Cellophane" which is tinted or colored the same as that of the color of the solder that no different appearance will be given to the solder than that desired, and I find that by using materials colored in this manner, usually by metallic material, that this metallic coated material also serves the purpose of preventing the solder from tarnishing which sometimes occurs due to certain papers which are used; and the following is a detailed description of the present embodiment of this invention, illustrating the preferred means by which these advantageous results may be accomplished.

With reference to the drawing 10 designates a core of cardboard or some suitable like material of extended length and each side of this material I provide spacing members 11 and 12, about which the strip of material here shown as solder and designated 13 is helically wound with one turn in contact with the next, as illustrated in Fig. 5, for a certain desired length such as 10 turns as there illustrated, after which a short space is left and another 10 turns are similarly wound for a considerable length along the core. After providing a winding in this manner I withdraw spacing members 11 and 12 and break the core along previously formed perforations 14 to form individual units such as are desired.

The spacing members when withdrawn leave openings 15 and 16 between the core 10 and the stretches 17 and 18 of the solder strips on either side thereof and into these spaces 15 and 16 I position a booklet 19 of instructions on soldering. This booklet consists of several folds of printed matter and along one outer folded edge 20 I provide a stripe of aluminum color with another stripe along the portion 21 which is also to be folded. This booklet is then inserted by passing the sections 22 through one space such for instance as 16, as illustrated in Figure 3, and then passing sections 23 and 24 through the other space 15 with the section 23 again folded to extend back into the space 16 and thereby cause the stripe 20 to appear over the one edge of the core and the stripe 21 to appear as covering the opposite edge of the core with the printed matter all covered by the solder and with the previously exposed edges of the core completely covered by the booklet. Thus a package of all aluminum appearance is provided as the color of the alloy of the solder is substantially aluminum color.

I then cover the entire assembly with a "Cellophane" envelope 25 which will be of a color also the same as that of the solder material although also it will be transparent to permit the material to be viewed therethrough and I hold this "Cellophane" envelope in position by a band 26 which is wrapped about the "Cellophane" envelope 25 with its overlapping portions 27 and 28 glued together whereby the package is protected from dust or dirt or tarnishment by reason of foreign matter in the paper or by reason of contact of the solder with the air. Also this harmonizing theme of color provides a package of highly ornamental appearance which is attractive for sale.

In some instances where it is thought unnecessary to provide a booklet striped as hereinabove disclosed the instruction sheet may be inserted as at 29 in Fig. 9 and colored caps 30 positioned over the booklet and the core to cover the core and cause the protruding edges beyond the solder to be of the same color and appearance as the solder.

The foregoing description is directed solely towards the construction illustrated, but I desire it to be understood that I reserve the privilege of resorting to all the mechanical changes to which the device is susceptible, the invention being defined and limited only by the terms of the appended claim.

I claim—

An ornamental package comprising a core, a strip of solder material wound about the core, a metallic covering for the core colored to correspond with the solder to provide a harmonious theme of ornamentation throughout the package.

ERNEST V. HALLIGAN.